US012112932B2

(12) United States Patent
Endo et al.

(10) Patent No.: US 12,112,932 B2
(45) Date of Patent: Oct. 8, 2024

(54) ION DETECTOR

(71) Applicant: HAMAMATSU PHOTONICS K.K., Hamamatsu (JP)

(72) Inventors: Takeshi Endo, Hamamatsu (JP); Hiroshi Kobayashi, Hamamatsu (JP)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 334 days.

(21) Appl. No.: 17/743,563

(22) Filed: May 13, 2022

(65) Prior Publication Data

US 2023/0005726 A1 Jan. 5, 2023

(30) Foreign Application Priority Data

Jul. 1, 2021 (JP) ................................ 2021-110138

(51) Int. Cl.
*H01J 43/30* (2006.01)
*H01J 43/12* (2006.01)

(52) U.S. Cl.
CPC .............. *H01J 43/30* (2013.01); *H01J 43/12* (2013.01)

(58) Field of Classification Search
None
See application file for complete search history.

(56) References Cited

U.S. PATENT DOCUMENTS 3,997,779 A * 12/1976 Rabl ....................... H01J 43/30 250/207
4,423,324 A * 12/1983 Stafford ................... G21K 1/14 976/DIG. 437
4,766,312 A * 8/1988 Fergusson ............. H01J 49/025 250/281
RE33,344 E * 9/1990 Stafford .................... G01T 1/28 250/281
5,463,219 A * 10/1995 Buckley ................ H01J 49/025 250/281
2019/0348265 A1* 11/2019 Steiner ................ H01J 49/0031

FOREIGN PATENT DOCUMENTS

JP 52119290 U * 9/1977
JP S52-119290 A 10/1977
JP H10154483 A * 6/1988
JP 3153337 B2 * 4/2001

* cited by examiner

*Primary Examiner* — Andrew Smyth
(74) *Attorney, Agent, or Firm* — Faegre Drinker Biddle & Reath LLP

(57) ABSTRACT

An ion detector includes: a first electron multiplier for detecting first ions having a first polarity; a second electron multiplier for detecting second ions having a second polarity different from the first polarity; a first anode for capturing electrons emitted from the first electron multiplier; a second anode for capturing electrons emitted from the second electron multiplier; and a switching circuit including a first input terminal electrically connected to the first anode, a second input terminal electrically connected to the second anode, and an output terminal, the switching circuit selectively connecting one of the first input terminal and the second input terminal to the output terminal.

13 Claims, 9 Drawing Sheets

ION DETECTOR

TECHNICAL FIELD

The present disclosure relates to an ion detector.

BACKGROUND

Ion detectors that detect positive and negative ions are known. For example, Japanese Unexamined Patent Application Publication No. 52-119290 discloses an ion detector including an electron multiplier tube for detecting positive ions and an electron multiplier tube for detecting negative ions.

SUMMARY

In the ion detector described in Japanese Unexamined Patent Application Publication No. 52-119290, a signal processing circuit such as an amplifier dedicated to each output of the electron multiplier tube for detecting positive ions and the electron multiplier tube for detecting negative ions is provided. Therefore, the circuit scale may be increased. In this technical field, it is desired to detect ions of both polarities while reducing the circuit scale.

The present disclosure describes an ion detector capable of detecting ions of both polarities while reducing circuit scale.

An ion detector according to one aspect of the present disclosure includes: a first electron multiplier that detects first ions having a first polarity; a second electron multiplier that detects second ions having a second polarity different from the first polarity; a first anode that captures electrons emitted from the first electron multiplier; a second anode that captures electrons emitted from the second electron multiplier; and a switching circuit that includes a first input terminal electrically connected to the first anode, a second input terminal electrically connected to the second anode, and an output terminal, and selectively connects one of the first input terminal and the second input terminal to the output terminal.

In the ion detector, the first anode that captures electrons emitted from the first electron multiplier that detects first ions having the first polarity is electrically connected to the first input terminal of the switching circuit, and the second anode that captures electrons emitted from the second electron multiplier that detects second ions having the second polarity is electrically connected to the second input terminal of the switching circuit. Since the switching circuit selectively connects one of the first input terminal and the second input terminal to the output terminal, a signal related to first ion detection and a signal related to second ion detection are selectively output from the output terminal. Therefore, since one signal processing circuit commonly used for first ion detection and second ion detection can be provided in a subsequent stage of the ion detector, it is not necessary to provide both a dedicated signal processing circuit for first ion detection and a dedicated signal processing circuit for second ion detection. As a result, ions of both polarities can be detected while the circuit scale is reduced.

The ion detector may further include an ion introduction unit provided with a through hole having a central axis extending in a first direction. The first electron multiplier may include a first multiplier extending in the first direction, a first input electrode provided at a first end of the first multiplier in the first direction, and a first output electrode provided at a second end of the first multiplier in the first direction. The second electron multiplier may include a second multiplier extending in the first direction, a second input electrode provided at a first end of the second multiplier in the first direction, and a second output electrode provided at a second end of the second multiplier in the first direction. The first input electrode may receive first ions that have passed through the through hole. The second input electrode may receive second ions that have passed through the through hole. The first electron multiplier and the second electron multiplier may be spaced apart from each other in a second direction intersecting with the first direction. In this case, the first electron multiplier and the second electron multiplier are provided so as to extend in the first direction while being spaced apart from each other in the second direction. Both the first input electrode and the second input electrode face the ion introduction unit in the first direction. Therefore, it is possible to reduce the possibility that the first input electrode receive noise derived from charged particles generated in the second electron multiplier. Similarly, it is possible to reduce the possibility that the second input electrode receives noise derived from charged particles generated in the first electron multiplier. As a result, the detection accuracy of first ions and second ions can be improved.

The first input electrode may include a first body facing the ion introduction unit in the first direction, and a first extension portion extending toward the first output electrode in the first direction. The first extension portion may cover a part of the first multiplier facing the second multiplier. For example, a negative voltage is applied to the first input electrode, and a positive voltage is applied to the second input electrode. The voltage of the first multiplier increases from the first input electrode toward the first output electrode, and the voltage of the second multiplier increases from the second input electrode toward the second output electrode. Therefore, even if the absolute value of the voltage applied to the first input electrode is equal to the absolute value of the voltage applied to the second input electrode, the difference between the absolute value of the voltage of the first multiplier and the absolute value of the voltage of the second multiplier increases toward the output electrode. In the above configuration, since the first extension portion of the first input electrode covers the part of the first multiplier facing the second multiplier, it is possible to improve the symmetry between the positive potential gradient and the negative potential gradient in the region where ions move. Therefore, the detection accuracy of first ions and second ions can be improved.

The first extension portion may have a cylindrical shape. In this case, the end portion including the first end of the first multiplier is surrounded around the axis of the first extension portion by the first extension portion. Compared to a configuration in which a part of the end portion including the first end of the first multiplier is covered by the first extension portion, the symmetry between a positive potential gradient and a negative potential gradient can be improved in a region where ions move. Therefore, the detection accuracy of first ions and second ions can be further improved.

The second input electrode may include a second body facing the ion introduction unit in the first direction, and a second extension portion extending toward the second output electrode in the first direction. The second extension portion may cover a part of the second multiplier facing the first multiplier. Since the second extension portion of the second input electrode covers the part of the second multiplier that faces the first multiplier, it is possible to improve the symmetry between the positive potential gradient and the negative potential gradient in the region where ions move. Therefore, the detection accuracy of first ions and second ions can be improved.

The second extension portion may have a cylindrical shape. In this case, the end portion including the first end of the second multiplier is surrounded around the axis of the second extension portion by the second extension portion. Compared to a configuration in which a part of the end portion including the first end of the second multiplier is covered by the second extension portion, the symmetry between a positive potential gradient and a negative potential gradient can be improved in a region where ions move. Therefore, the detection accuracy of first ions and second ions can be further improved.

A distance between the first electron multiplier and the central axis in the second direction may be equal to a distance between the second electron multiplier and the central axis in the second direction. This makes it possible to simplify the design of the arrangement of the first electron multiplier and the second electron multiplier.

The first ions may be positive ions. The second ions may be negative ions. A distance between the first electron multiplier and the central axis in the second direction may be larger than a distance between the second electron multiplier and the central axis in the second direction. As described above, when the symmetry between the positive potential gradient and the negative potential gradient in the region where the ions move is broken, the force that pulls first ions away from the second electron multiplier in the second direction becomes larger than the force that pulls second ions away from the first electron multiplier in the second direction. In other words, first ions move farther away from the central axis than second ions. According to the above configuration, since the first electron multiplier is farther away from the central axis than the second electron multiplier, it is possible to increase the possibility that first ions enter the first input electrode and second ions enter the second input electrode. Therefore, the detection accuracy of first ions and second ions can be improved.

The ion detector may further include a substrate including a main surface facing the ion introduction unit in the first direction. The first anode and the second anode may be provided on the main surface. The first electron multiplier may be disposed on the main surface such that the first output electrode faces the first anode in the first direction. The second electron multiplier may be disposed on the main surface such that the second output electrode faces the second anode in the first direction. In this case, the first electron multiplier and the second electron multiplier are disposed on one substrate. Therefore, since the distance between the first electron multiplier and the second electron multiplier is constant, the assembly accuracy of the ion detector can be improved.

The switching circuit may be mounted on the substrate. In this case, the components of the ion detector can be mounted on one substrate. Therefore, the number of parts can be reduced.

The substrate may be provided with a slit penetrating the substrate in the first direction between the first anode and the second anode. When the potential difference between the first anode and the second anode is large, a creeping discharge may occur along the main surface of the substrate between the first anode and the second anode. In the above configuration, since the slit is provided between the first anode and the second anode, the creeping distance between the first anode and the second anode becomes longer. This can reduce the possibility of a creeping discharge occurring between the first anode and the second anode.

The ion detector may further include a support member provided on the main surface and supporting the ion introduction unit. In this case, since the ion introduction unit is supported by the support member, the position of the central axis (through hole) is determined. This makes it possible to improve the assembly accuracy of the ion detector.

The ion detector may further include a first substrate including a first main surface facing the ion introduction unit in the first direction and a second substrate including a second main surface facing the ion introduction unit in the first direction. The first anode may be provided on the first main surface. The second anode may be provided on the second main surface. The first electron multiplier may be disposed on the first main surface such that the first output electrode faces the first anode in the first direction. The second electron multiplier may be disposed on the second main surface such that the second output electrode faces the second anode in the first direction. In this case, since the first anode and the second anode are disposed on different substrates, it is possible to reduce the possibility of a creeping discharge occurring between the first anode and the second anode.

According to the present disclosure, ions of both polarities can be detected while reducing the circuit scale.

DETAILED DESCRIPTION

In the following, some embodiments of the present disclosure will be described with reference to the drawings. It should be noted that in the description of the drawings, the same components are designated with the same reference signs, and the redundant description is omitted.

Figure 1:
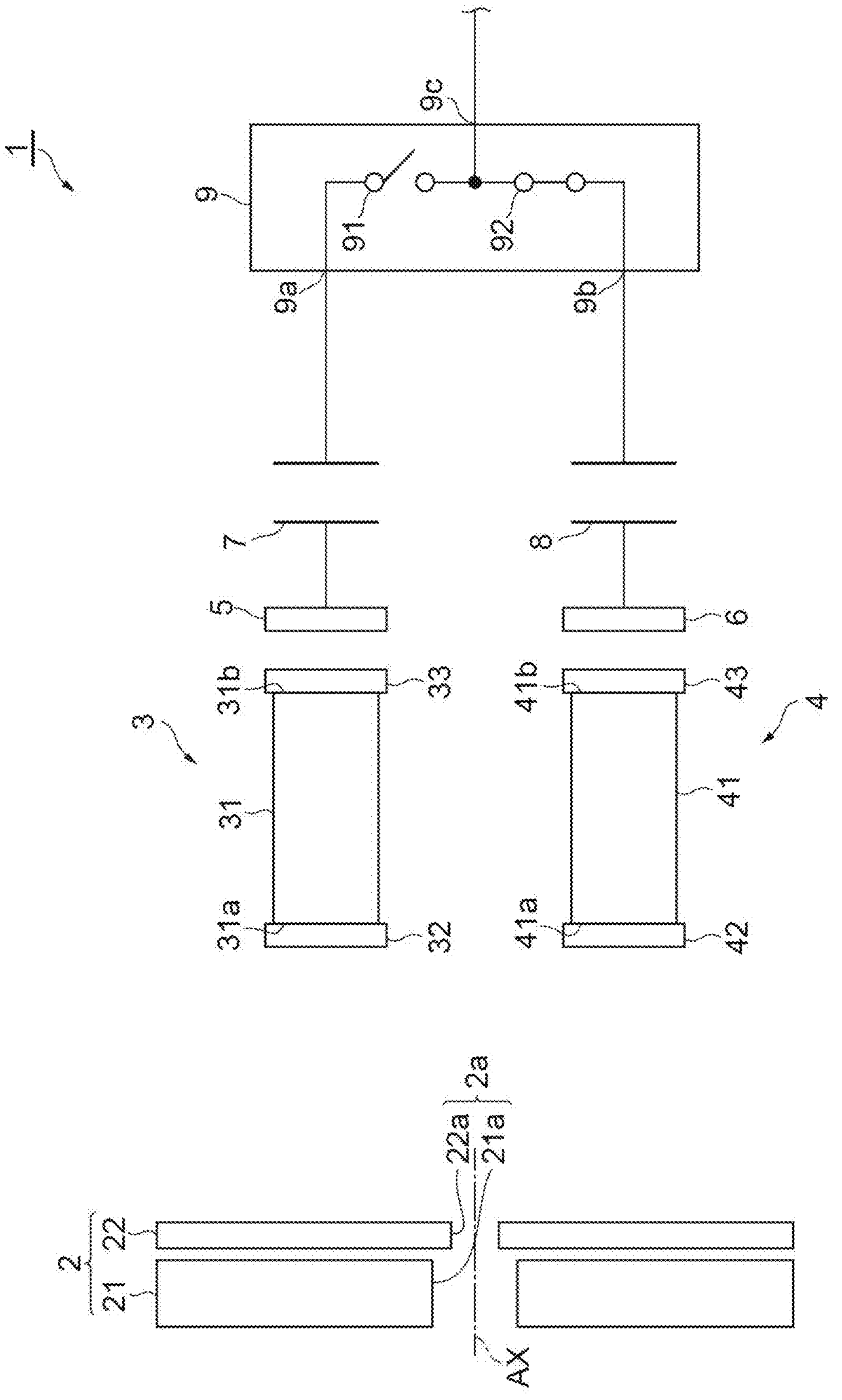
FIG. 1 is a configuration diagram schematically showing an ion detector according to an embodiment.

A schematic configuration of an ion detector according to an embodiment will be described with reference to FIG. 1. FIG. 1 is a configuration diagram schematically showing an ion detector according to an embodiment. The ion detector 1 shown in FIG. 1 is a device capable of detecting ions of both polarities. The ion detector 1 is applied to, for example, a mass spectrometer. The ion detector 1 includes an ion introduction unit 2, an electron multiplier 3 (first electron multiplier, an electron multiplier 4 (second electron multiplier), an anode 5 (first anode), an anode 6 (second anode), a capacitor 7, a capacitor 8, and a switching circuit 9.

The ion introduction unit 2 is a section for passing ions from the outside of the ion detector 1 into the internal space S (see FIG. 2) of the ion detector 1. The ion introduction unit 2 may be an aperture member for shielding external noise. The ion introduction unit 2 includes an ion lens 21 and an ion lens 22. The ion lens 21 is a plate-like conductive member. The ion lens 21 is provided with an opening 21*a* penetrating the ion lens 21. The ion lens 21 is grounded, for example.

The ion lens 22 is a plate-like conductive member. The ion lens 22 is provided with an opening 22*a* penetrating the ion lens 22. The ion lens 22 is disposed such that the central axis of the opening 21*a* and the central axis of the opening 22*a* are arranged concentrically. That is, the ion introduction unit 2 is provided with a through hole 2*a* having a central axis AX. The through hole 2*a* is constituted by an opening 21*a* and an opening 22*a*.

Either a positive voltage or a negative voltage is selectively applied to the ion lens 22. When the ion detector 1 detects positive ions (first ions having first polarity), a negative voltage is applied to the ion lens 22. With this configuration, positive ions are converged and introduced into the internal space S by passing through the opening 21*a* and the opening 22*a* in order. When the ion detector 1 detects negative ions (second ions having a second polarity), a positive voltage is applied to the ion lens 22. With this configuration, negative ions are converged and introduced into the internal space S by passing through the opening 21*a* and the opening 22*a* in order. The positive voltage applied to the ion lens 22 is, for example, about 500 V. The negative voltage applied to the ion lens 22 is, for example, about −500 V.

The electron multiplier 3 is a structure for detecting positive ions. The electron multiplier 4 is a structure for detecting negative ions. Examples of the electron multipliers 3 and 4 include a channel electron multiplier (CEM), an electron multiplier tube (EM tube), a combination of a microchannel plate (MCP) and an avalanche diode (AD), an MSP (including an MCP, a scintillator and a photomultiplier tube (PMT)), and a combination of two of these. Further a conversion dynode (CD) may be provided in the CEM, EM tube, and AD. In the present embodiment, CEM is exemplified as the electron multipliers 3 and 4.

The electron multiplier 3 includes a multiplier 31 (first multiplier), an input electrode 32 (first input electrode), and an output electrode 33 (first output electrode). The multiplier 31 extends in one direction and has, for example, a rectangular parallelepiped shape. The multiplier 31 has end faces 31*a* and 31*b*. The end face 31*a* (one end) is one end face in the longitudinal direction of the multiplier 31 and faces the ion introduction unit 2. The end face 31*b* (other end) is an end face opposite to the end face 31*a* in the longitudinal direction of the multiplier 31. The multiplier 31 includes an insulating material such as a ceramic material, for example. The multiplier 31 has a plurality of channels extending from the end face 31*a* to the end face 31*b*.

The input electrode 32 receives positive ions having passed through the through hole 2*a* and converts positive ions into electrons. The input electrode 32 is provided on the end face 31*a*. The input electrode 32 is made of a conductive metal material. A negative high voltage is applied to the input electrode 32. A voltage of, for example, about −10 kV is applied to the input electrode 32.

The output electrode 33 is provided on the end face 31*b*. The output electrode 33 is made of a conductive metal material. A negative high voltage that is larger than the voltage applied to the input electrode 32 is applied to the output electrode 33. That is, a negative high voltage is applied to the output electrode 33 so that the potential of the output electrode 33 is higher than the potential of the input electrode 32. The voltage applied to the output electrode 33 is about 2 to 4 kV higher than the voltage applied to the input electrode 32. By the input electrode 32 and the output electrode 33, a potential gradient is generated along the longitudinal direction of the multiplier 31 in the multiplier 31 so as to increase the potential from the end face 31*a* toward the end face 31*b*.

The electron multiplier 4 includes a multiplier 41 (second multiplier), an input electrode 42 (second input electrode), and an output electrode 43 (second output electrode). The multiplier 41 extends in one direction and has, for example, a rectangular parallelepiped shape. The multiplier 41 has end faces 41*a* and 41*b*. The end face 41*a* (one end) is one end face in the longitudinal direction of the multiplier 41 and faces the ion introduction unit 2. The end face 41*b* (other end) is an end face opposite to the end face 41*a* in the longitudinal direction of the multiplier 41. The multiplier 41 includes an insulating material such as a ceramic material, for example. The multiplier 41 has a plurality of channels extending from the end face 41*a* to the end face 41*b*.

The input electrode 42 receives negative ions having passed through the through hole 2*a* and converts the negative ions into electrons. The input electrode 42 is provided on the end face 41*a*. The input electrode 42 is made of a conductive metal material. A positive high voltage is applied to the input electrode 42. A voltage of, for example, about +10 kV is applied to the input electrode 42.

The output electrode 43 is provided on the end face 41*b*. The output electrode 43 is made of a conductive metal material. A positive high voltage that is higher than the voltage applied to the input electrode 42 is applied to the output electrode 43. That is, a positive high voltage is applied to the output electrode 43 so that the potential of the output electrode 43 is higher than the potential of the input electrode 42. The voltage applied to the output electrode 43 is about 2 to 4 kV higher than the voltage applied to the input electrode 42. By the input electrode 42 and the output electrode 43, a potential gradient is generated along the longitudinal direction of the multiplier 41 in the multiplier 41 so as to increase the potential from the end face 41*a* toward the end face 41*b*.

The anode 5 is an electrode for capturing electrons emitted from the electron multiplier 3. The anode 5 outputs an electrical signal corresponding to the captured electrons. The anode 5 outputs the electrical signal to the switching circuit 9 via the capacitor 7. The anode 6 is an electrode for capturing electrons emitted from the electron multiplier 4. The anode 6 outputs an electrical signal corresponding to the captured electrons. The anode 6 outputs the electrical signal to the switching circuit 9 via the capacitor 8.

The capacitors 7 and 8 are alternating current (AC) coupling capacitors. The capacitor 7 removes a direct current (DC) offset voltage from the electrical signal output from the anode 5. The capacitor 8 removes a DC offset voltage from the electrical signal output from the anode 6.

The switching circuit 9 is a circuit for selectively connecting one of the anode 5 and the anode 6 to a signal processing circuit such as an amplifier in a subsequent stage. Examples of the switching circuit 9 include a radio frequency (RF) switch integrated circuit (IC) and a non-contact relay. An example of a non-contact relay is a metal oxide semiconductor field effect transistor (MOSFET). The switching circuit 9 selects an anode to be measured from among the anode 5 and the anode 6 according to a switching signal from the outside. The switching circuit 9 has an input terminal 9*a* (first input terminal), an input terminal 9*b* (second input terminal), and an output terminal 9*c*. The input terminal 9*a* is electrically connected to the anode 5. In this embodiment, the input terminal 9*a* is electrically connected to the anode 5 via the capacitor 7. The input terminal 9*b* is electrically connected to the anode 6. In this embodiment, the input terminal 9*b* is electrically connected to the anode 6 via the capacitor 8. The output terminal 9*c* is electrically connected to the signal processing circuit in the subsequent stage.

The switching circuit 9 selectively connects one of the input terminal 9*a* and the input terminal 9*b* to the output terminal 9*c*. The switching circuit 9 is switched between the first state and the second state by the switching signal from the outside. The first state is a state in which the input terminal 9*a* and the output terminal 9*c* are electrically connected to each other, and the input terminal 9*b* and the output terminal 9*c* are electrically disconnected from each other. The second state is a state in which the input terminal 9*a* and the output terminal 9*c* are electrically disconnected from each other, and the input terminal 9*b* and the output terminal 9*c* are electrically connected to each other.

The switching circuit 9 includes a switch 91 and a switch 92. The switch 91 is provided between the input terminal 9*a* and the output terminal 9*c*. The switch 91 can be switched between an ON state in which the input terminal 9*a* and the output terminal 9*c* are electrically connected to each other and an OFF state in which the input terminal 9*a* and the output terminal 9*c* are electrically disconnected from each other. The switch 92 is provided between the input terminal 9*b* and the output terminal 9*c*. The switch 92 can be switched between an ON state in which the input terminal 9*b* and the output terminal 9*c* are electrically connected to each other and an OFF state in which the input terminal 9*b* and the output terminal 9*c* are electrically disconnected from each other. By the switching signal, the switch 91 and the switch 92 are set in opposite states. That is, when the switch 91 is set to the ON state, the switch 92 is set to the OFF state (first state), and when the switch 91 is set to the OFF state, the switch 92 is set to the ON state (second state).

Next, the operation of the ion detector 1 will be described. When the ion detector 1 detects positive ions, the switch 91 is set to the ON state and the switch 92 is set to the OFF state, and then a negative voltage is applied to the ion lens 22. Positive ions are attracted to the negative voltage of the ion lens 22, pass through the opening 21*a* and the opening 22*a* in order, and are introduced into the internal space S of the ion detector 1. Since a negative high voltage is applied to the input electrode 32, the positive ions move toward the input electrode 32 and enter the input electrode 32. Electrons generated in response to the positive ions entering the input electrode 32 are multiplied by the multiplier 31 and emitted from the output electrode 33. The electrons emitted from the output electrode 33 are captured by the anode 5, and an electrical signal corresponding to the electrons is output to the input terminal 9*a* via the capacitor 7. Since the input terminal 9*a* and the output terminal 9*c* are electrically connected to each other in the switching circuit 9, the electrical signal is output from the output terminal 9*c* to the signal processing circuit in the subsequent stage.

When the ion detector 1 detects negative ions, the switch 91 is set to the OFF state and the switch 92 is set to the ON state, and then a positive voltage is applied to the ion lens 22. Negative ions are attracted to the positive voltage of the ion lens 22, pass through the opening 21*a* and the opening 22*a* in order, and are introduced into the internal space S of the ion detector 1. Since a positive high voltage is applied to the input electrode 42, the negative ions move toward the input electrode 42 and enter the input electrode 42. Electrons generated in response to the negative ions entering the input electrode 42 are multiplied by the multiplier 41 and emitted from the output electrode 43. The electrons emitted from the output electrode 43 are captured by the anode 6, and an electrical signal corresponding to the electrons is output to the input terminal 9*b* via the capacitor 8. Since the input terminal 9*b* and the output terminal 9*c* are electrically connected to each other in the switching circuit 9, the electrical signal is output from the output terminal 9*c* to the signal processing circuit in the subsequent stage.

In the ion detector 1 described above, the anode 5 for capturing electrons emitted from the electron multiplier 3 for detecting positive ions is electrically connected to the input terminal 9*a* of the switching circuit 9, and the anode 6 for capturing electrons emitted from the electron multiplier 4 for detecting negative ions is electrically connected to the input terminal 9*b* of the switching circuit 9. Since the switching circuit 9 selectively connects either the input terminal 9*a* or the input terminal 9*b* to the output terminal 9*c*, an electrical signal related to positive ion detection and an electrical signal related to negative ion detection are selectively output from the output terminal 9*c*. Therefore, since one signal processing circuit commonly used for positive ion detection and negative ion detection is provided in the subsequent stage of the ion detector 1, there is no need to provide both a dedicated signal processing circuit for positive ion detection and a dedicated signal processing circuit for negative ion detection. As a result, ions of both polarities can be detected while the circuit scale is reduced.

Since ions of both polarities are directly converted into electrons in the ion detector 1, it is possible to improve the detection efficiency of ions of both polarities. Since the electron multiplier 3 for positive ion detection and the electron multiplier 4 for negative ion detection are provided, the lifetime of the ion detector 1 can be extended to about twice as long as that of the configuration in which one electron multiplier is used for the detection of ions of both polarities. Since the switching circuit 9 electrically isolates the anode 5 from the anode 6, the dark count of the other anode can be reduced and the influence of the capacitance of the other anode can be eliminated, as compared with the configuration in which the anode 5 and the anode 6 are directly connected to the signal processing circuit in the subsequent stage. As a result, the degradation of the output waveform can be suppressed.

Figure 2:
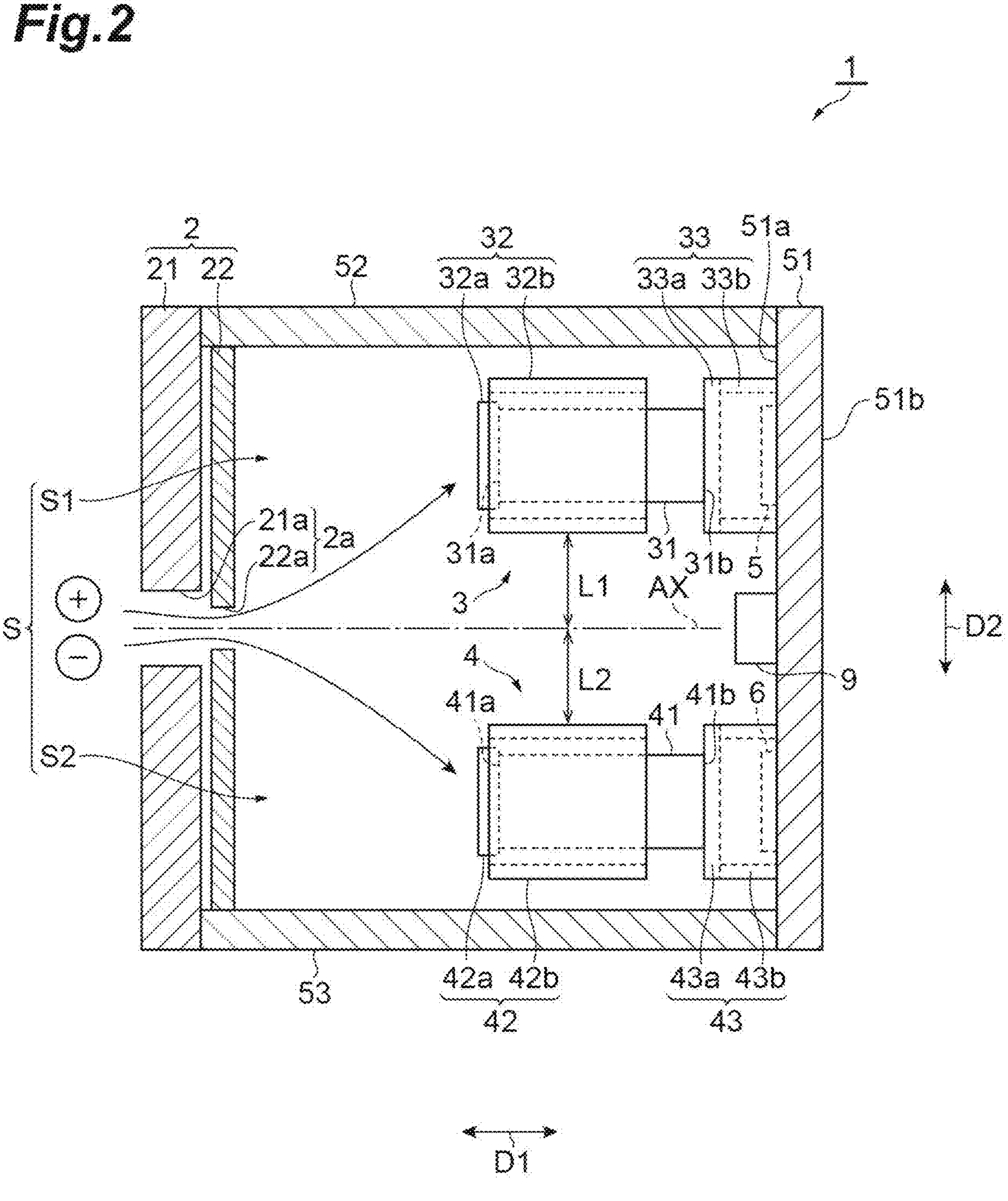
FIG. 2 is a cross-sectional view showing a mounting example of the ion detector shown in FIG. 1.
Figure 3:
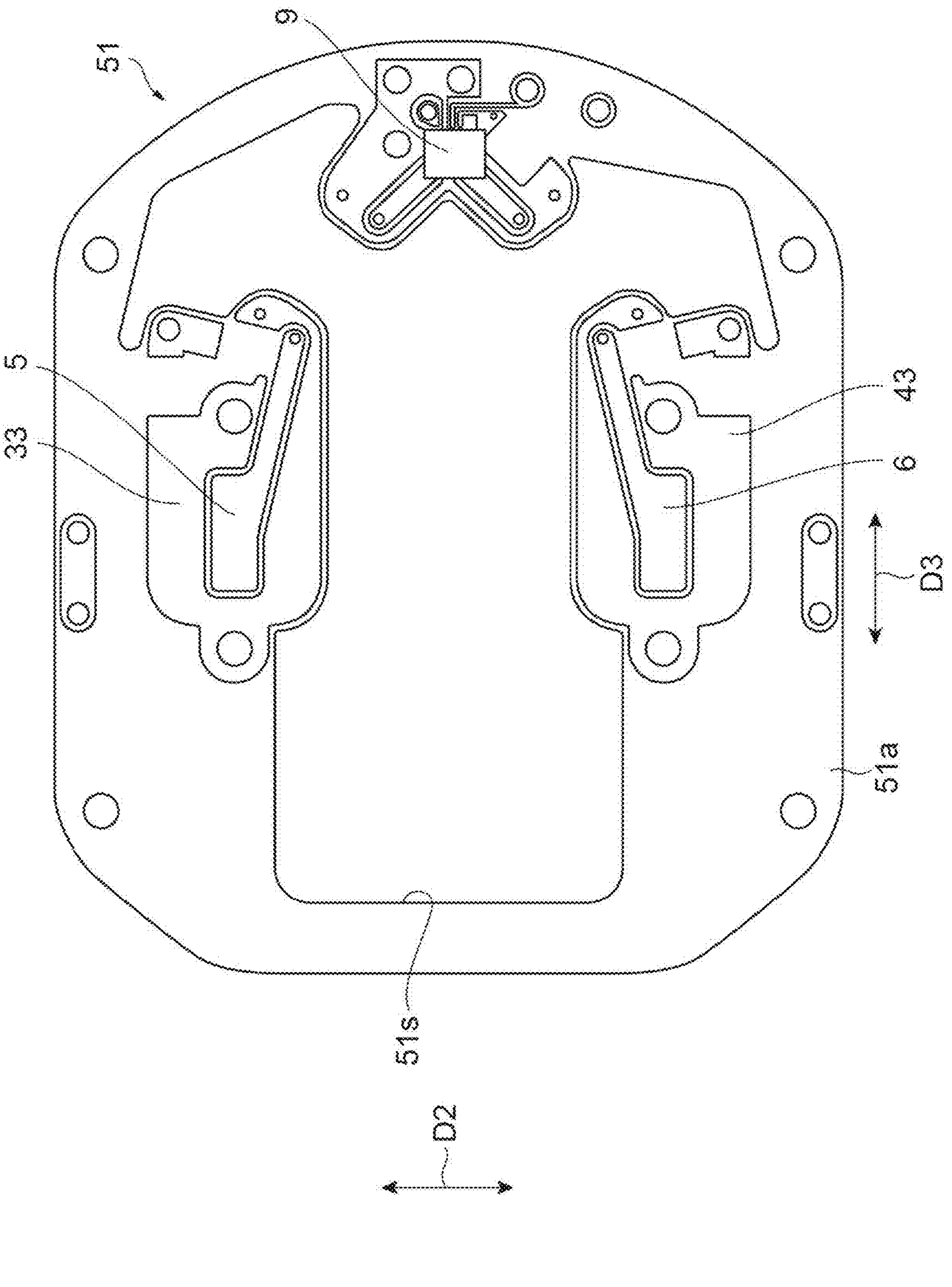
FIG. 3 is a plan view of the substrate shown in FIG. 2.

Next, a mounting example of the ion detector 1 shown in FIG. 1 will be described with reference to FIGS. 2 and 3. FIG. 2 is a cross-sectional view showing a mounting example of the ion detector shown in FIG. 1. FIG. 3 is a plan view of the substrate shown in FIG. 2. As shown in FIG. 2, the ion detector 1 further includes a substrate 51, a spacer 52, and a spacer 53.

The substrate 51 is a plate-like member on which the components of the ion detector 1 are mounted. The substrate 51 is, for example, a printed circuit board such as a glass epoxy substrate. The substrate 51 has a main surface 51*a* and a back surface 51*b* opposite to the main surface 51*a*. The main surface 51*a* intersects with (here, orthogonal to) the direction D1 (first direction).

Each of the spacers 52 and 53 is a support member for supporting the ion introduction unit 2. Each of the spacers 52 and 53 is provided on the main surface 51*a* and extends in the direction D1. The ion lenses 21 and 22 are fixed so that the central axis AX extends in the direction D1. Specifically, the base end of each of the spacers 52 and 53 is fixed to the substrate 51 by a fixing member such as a screw. The ion introduction unit 2 is attached to the distal ends of the spacers 52 and 53 so that the main surface 51*a* faces the ion introduction unit 2 in the direction D1. More specifically, the ion lens 21 is placed on the distal ends of the spacers 52 and 53, and the ion lens 22 is held between the spacers 52 and 53. The ion lens 21 and the ion lens 22 are fixed to the spacers 52 and 53 by a fixing member such as a screw. In this way, the ion introduction unit 2 is fixed to the substrate 51 by the spacers 52 and 53.

The anodes 5 and 6 are provided on the main surface 51*a*. The anodes 5 and 6 may be formed on the main surface 51*a* as a wiring pattern. The anode 5 and the anode 6 are arranged in a direction D2 (second direction). The direction D2 is a direction intersecting (here, orthogonal to) the direction D1, and extends along the main surface 51*a*. The anode 5 and the anode 6 are arranged substantially symmetrically with respect to a virtual plane. The virtual plane is a plane that is perpendicular to the direction D2 and extends along the central axis AX.

As shown in FIG. 3, the substrate 51 is provided with a slit 51*s* penetrating the substrate 51 in the direction D1 between the anode 5 and the anode 6. The slit 51*s* is provided in order to extend the creeping distance between the anode 5 and the anode 6. In the example shown in FIG. 3, the slit 51*s* extends in direction D3 between the anode 5 and the anode 6. The direction D3 is a direction intersecting (here, orthogonal to) the direction D1 and the direction D2, and extends along the main surface 51*a*. The slit 51*s* extends to the vicinity of both ends of the substrate 51 in the direction D3. The slit 51*s* extends not only between the anode 5 and the anode 6, but also between the anode 5 and the switching circuit 9 and between the anode 6 and the switching circuit 9.

The electron multiplier 3 is disposed on the main surface 51*a* so that the output electrode 33 faces the anode 5 in the direction D1. The electron multiplier 4 is disposed on the main surface 51*a* so that the output electrode 43 faces the anode 6 in the direction D1. The electron multipliers 3 and 4 (multipliers 31 and 41) extend in the direction D1. The electron multiplier 3 and the electron multiplier 4 are spaced apart from each other in the direction D2. The distance L1 in the direction D2 between the electron multiplier 3 and the central axis AX is substantially equal to the distance L2 in the direction D2 between the electron multiplier 4 and the central axis AX. In other words, the electron multiplier 3 and the electron multiplier 4 are arranged substantially in plane symmetry with respect to the virtual plane. The electron multiplier 3 and the anode 5 are arranged in the space S1, and the electron multiplier 4 and the anode 6 are arranged in the space S2. The space S1 and the space S2 are spaces obtained by dividing the internal space S by the virtual plane.

In this mounting example, the input electrode 32 includes a body 32*a* (first body) and an extension portion 32*b* (first extension portion). The body 32*a* is provided on the end face 31*a* and covers the entire surface of the end face 31*a*. The body 32*a* has, for example, a rectangular plate-like shape and is one size larger than the end face 31*a* when viewed from the direction D1. The body 32*a* faces the ion introduction unit 2 in the direction D1.

The extension portion 32*b* is a portion extending toward the output electrode 33 in the direction D1. The extension portion 32*b* covers at least a part of the side surface of the multiplier 31 that faces the multiplier 41. In this mounting example, the extension portion 32*b* has a cylindrical shape and covers the entire circumference of the end portion including the end face 31*a* of the multiplier 31. The extension portion 32*b* is provided along the peripheral edge of the body 32*a* and extends toward the output electrode 33. The extension portion 32*b* extends to a position closer to the end face 31*b* than half of the length of the multiplier 31 in the direction D1. The extension portion 32*b* is spaced apart from the side surface of the multiplier 31.

In this mounting example, the output electrode 33 includes a body 33*a* and a support portion 33*b*. The body 33*a* is provided on the end face 31*b* and covers the entire surface of the end face 31*b*. The body 33*a* has, for example, a rectangular plate-like shape, and is one size larger than the end face 31*b* when viewed from the direction D1. The body 33*a* is supported by the support portion 33*b*. The support portion 33*b* has a cylindrical shape. One end of the support portion 33*b* is connected to the body 33*a*, and the other end of the support portion 33*b* is fixed to the main surface 51*a* of the substrate 51 by screws, welding or the like. The anode 5 is surrounded by the support portion 33*b* around the axis of the support portion 33*b*.

In this mounting example, the input electrode 42 includes a body 42*a* (second body) and an extension portion 42*b* (second extension portion). The body 42*a* is provided on the end face 41*a* and covers the entire surface of the end face 41*a*. The body 42*a* has, for example, a rectangular plate-like shape and is one size larger than the end face 41*a* when viewed from the direction D1. The body 42*a* faces the ion introduction unit 2 in the direction D1.

The extension portion 42*b* is a portion extending toward the output electrode 43 in the direction D1. The extension portion 42*b* covers at least a part of the side surface of the multiplier 41 facing the multiplier 31. In this mounting example, the extension portion 42*b* has a cylindrical shape and covers the entire circumference of the end portion including the end face 41*a* of the multiplier 41. The extension portion 42*b* is provided along the peripheral edge of the body 42*a* and extends toward the output electrode 43. The extension portion 42*b* extends to a position closer to the end face 41*b* than half the length of the multiplier 41 in the direction D1. The extension portion 42*b* is spaced apart from the side surface of the multiplier 41.

In this mounting example, the output electrode 43 includes a body 43*a* and a support portion 43*b*. The body 43*a* is provided on the end face 41*b* and covers the entire surface of the end face 41*b*. The body 43*a* has a rectangular plate-like shape, for example, and is one size larger than the end face 41*b* when viewed from the direction D1. The body 43*a* is supported by the support portion 43*b*. The support portion 43*b* has a cylindrical shape. One end of the support portion 43*b* is connected to the body 43*a*, and the other end of the support portion 43*b* is fixed to the main surface 51*a* of the substrate 51 by screws, welding or the like. The anode 6 is surrounded by the support portion 43*b* around the axis of the support portion 43*b*.

The switching circuit 9 is mounted on the main surface 51*a*. The switching circuit 9 may be mounted on the back surface 51*b*. Although not shown in FIG. 2, the capacitors 7 and 8 are mounted on the substrate 51. The capacitors 7 and 8 may be mounted on the main surface 51*a* or on the back surface 51*b*. Further, an output terminal for connecting to the signal processing circuit in the subsequent stage may be mounted on the substrate 51. As the output terminal, an SMA (Sub Miniature Type A) connector or the like is used.

Figure 4:
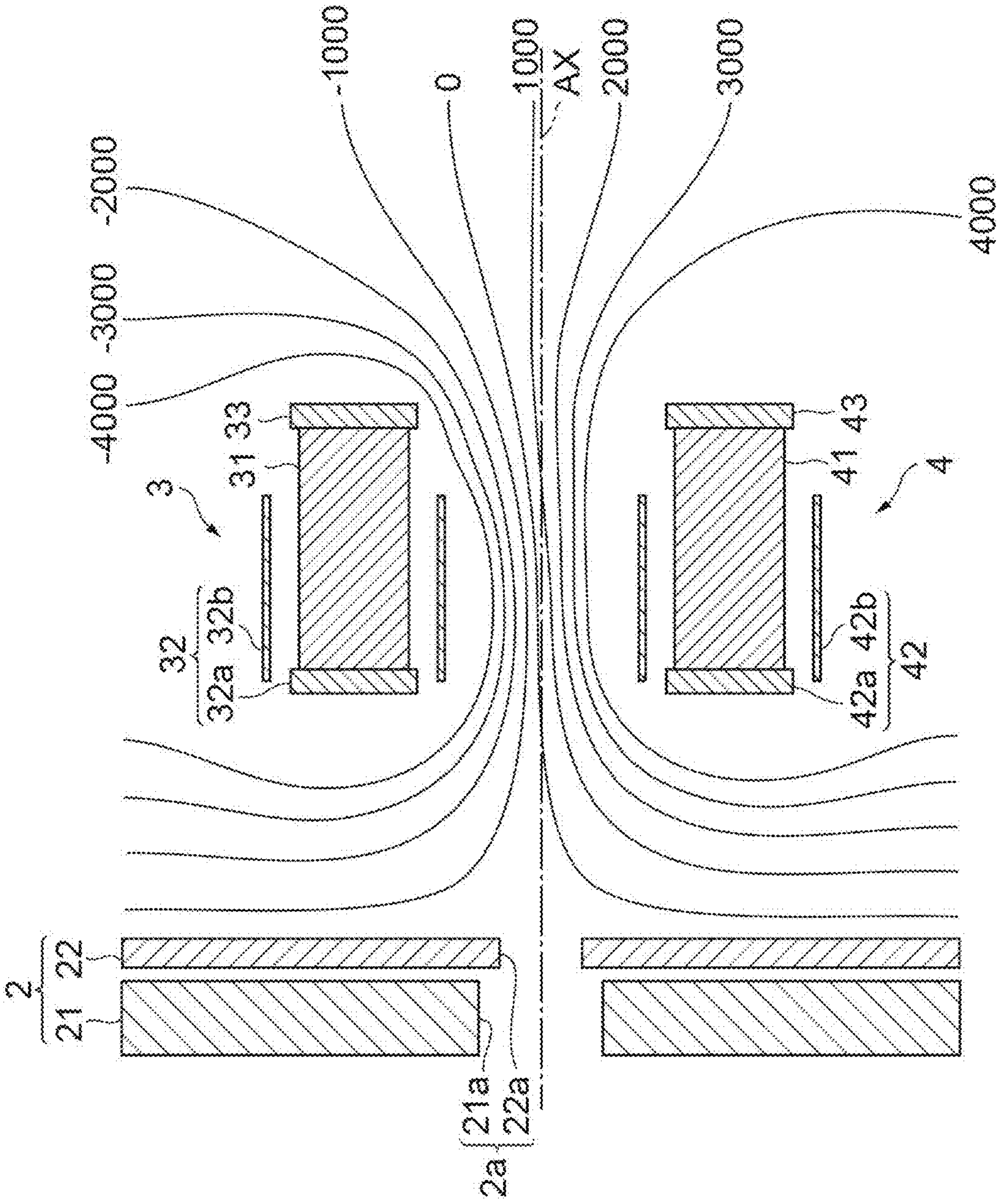
FIG. 4 is a diagram showing equipotential lines at the time of positive ion detection of the ion detector shown in FIG. 2.
Figure 5:
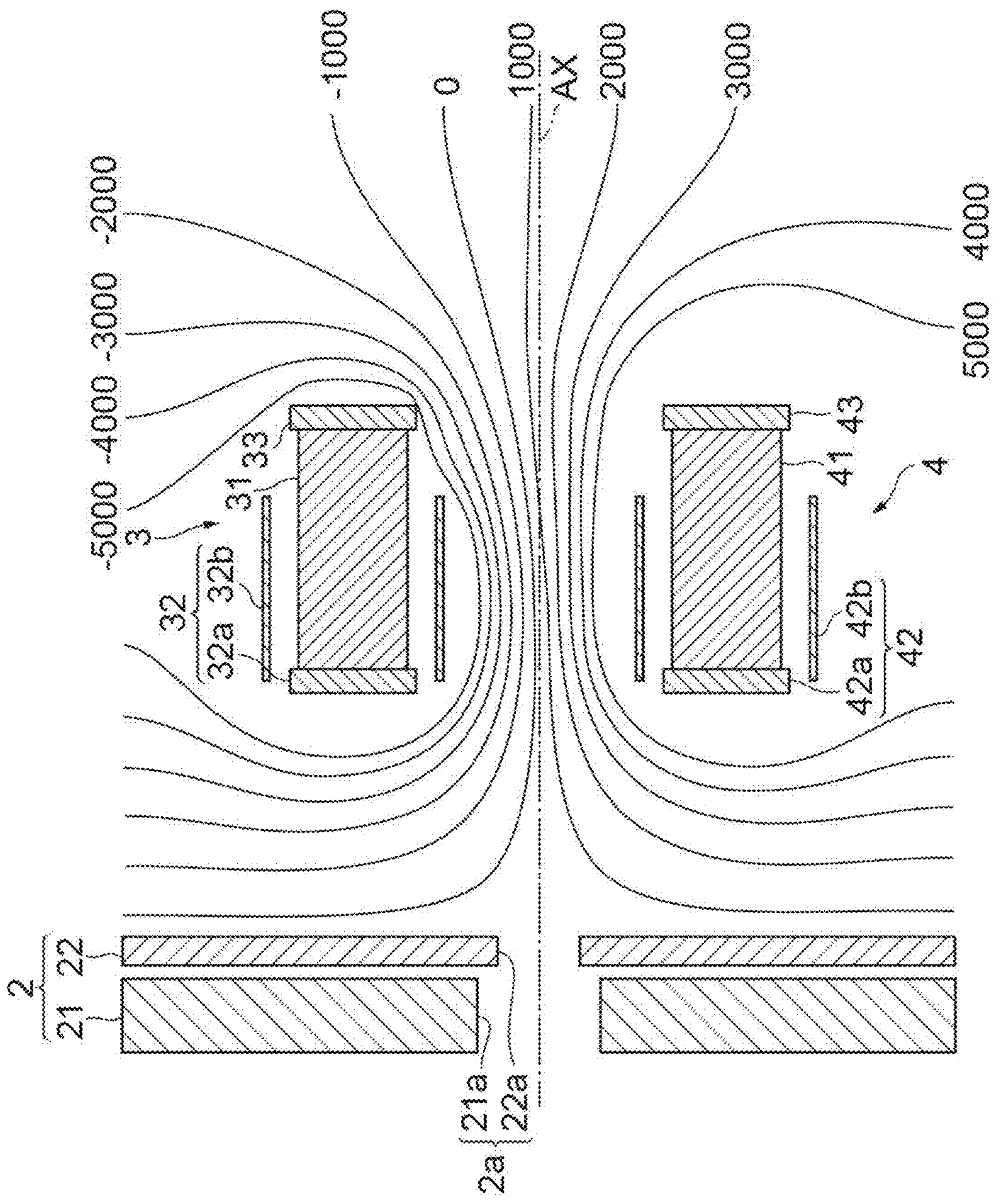
FIG. 5 is a diagram showing equipotential lines at the time of negative ion detection of the ion detector shown in FIG. 2.
Figure 6:
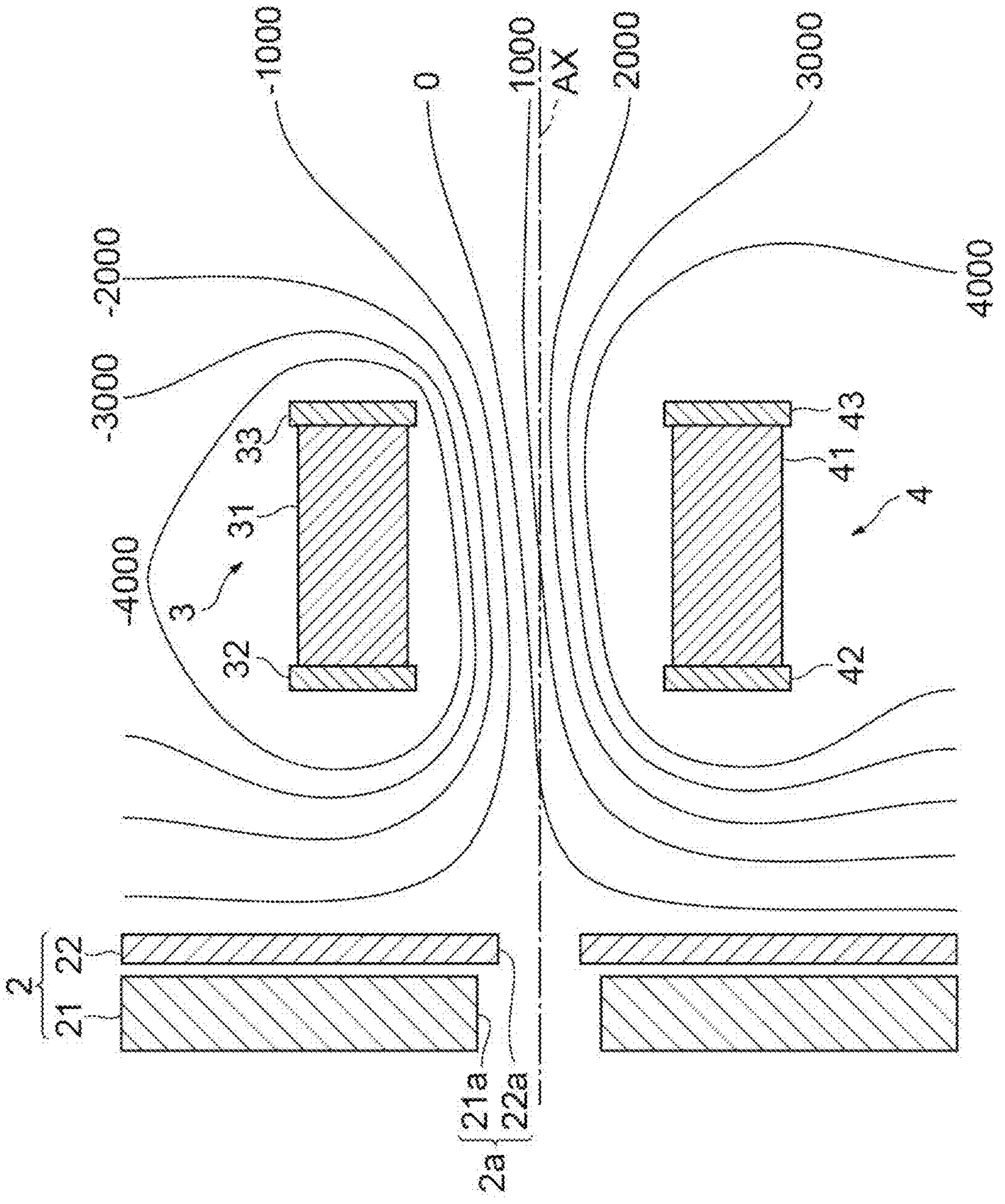
FIG. 6 is a diagram showing equipotential lines at the time of positive ion detection of an ion detector according to another mounting example.
Figure 7:
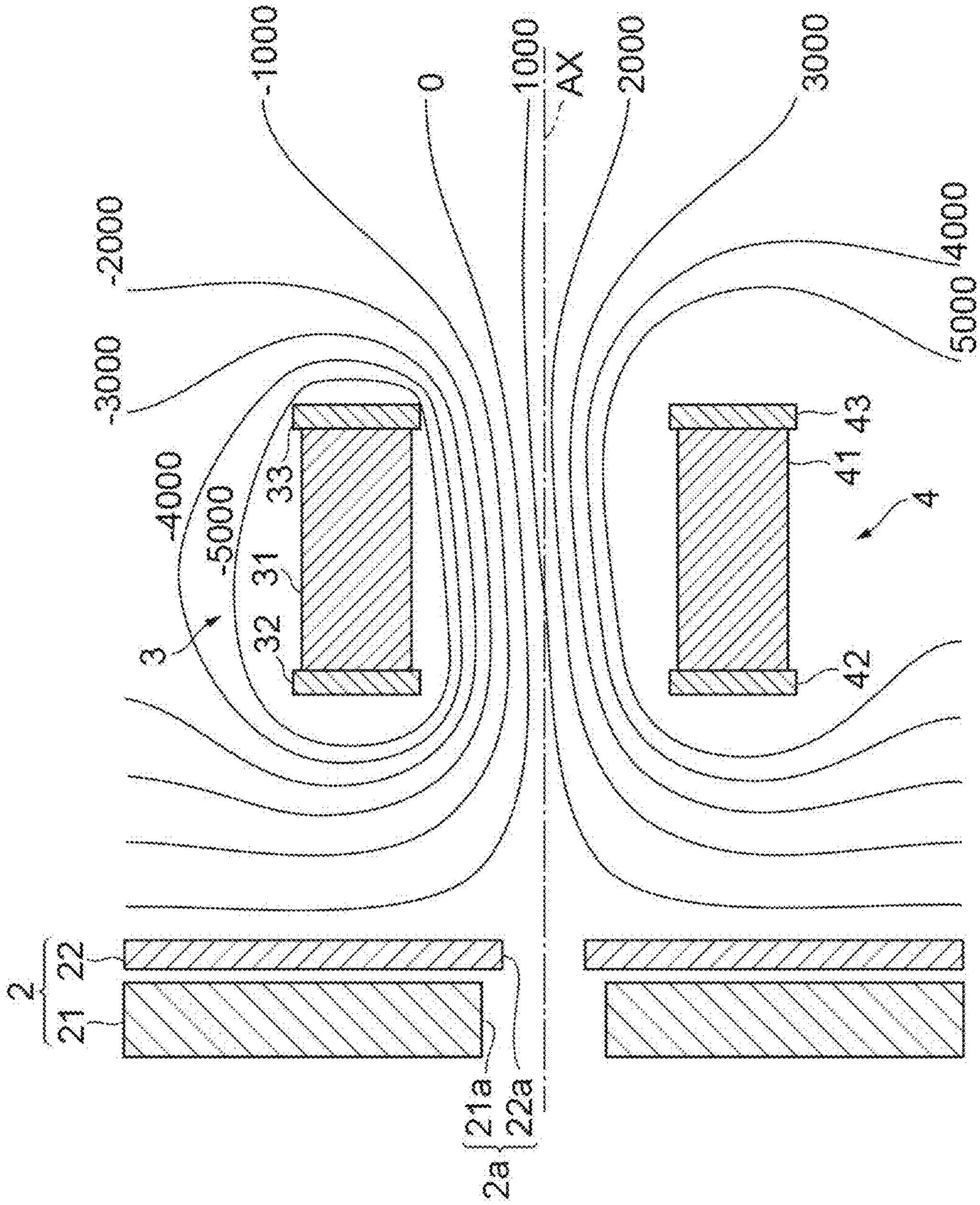
FIG. 7 is a diagram showing equipotential lines at the time of negative ion detection of an ion detector according to another mounting example.

Next, the operation and effect of the ion detector 1 according to the above-described mounting example will be described with reference to FIGS. 4 to 7. FIG. 4 is a diagram showing equipotential lines at the time of positive ion detection of the ion detector shown in FIG. 2. FIG. 5 is a diagram showing equipotential lines at the time of negative ion detection of the ion detector shown in FIG. 2. FIG. 6 is a diagram showing equipotential lines at the time of positive ion detection of an ion detector according to another mounting example. FIG. 7 is a diagram showing equipotential lines at the time of negative ion detection of an ion detector according to another mounting example. The ion detector according to another mounting example shown in FIGS. 6 and 7 differs from the ion detector shown in FIGS. 4 and 5 in that the input electrode 32 does not include the extension portion 32*b* and the input electrode 42 does not include the extension portion 42*b*.

The equipotential lines shown in FIGS. 4 to 7 were calculated by simulation. FIGS. 4 to 7 show an equipotential line for every 1000 V in the range of −5000V to +5000 V. As the electron multiplier 3 and the anode 5, a simulation model in which the body 32*a*, the multiplier 31, the output electrode 33, and the anode 5 are integrated was used. As the electron multiplier 4 and the anode 6, a simulation model in which the body 42*a*, the multiplier 41, the output electrode 43, and the anode 6 are integrated was used. A voltage of −10 kV was applied to the input electrode 32, and a voltage of −6.5 kV was applied to the anode 5. A voltage of +10 kV was applied to the input electrode 42, and a voltage of +13.5 kV was applied to the anode 6. A ground potential was applied to the ion lens 21. In the calculation of the equipotential lines shown in FIGS. 4 and 6, a voltage of −500 V was applied to the ion lens 22. In the calculation of the equipotential lines shown in FIGS. 5 and 7, a voltage of +500 V was applied to the ion lens 22.

As shown in FIGS. 4 to 7, in the space 51, a negative potential becomes dominant due to the voltage applied to the electron multiplier 3, and the potential becomes lower as a position approaches the electron multiplier 3. In the space S2, a positive potential becomes dominant due to a voltage applied to the electron multiplier 4, and the potential becomes higher as a position approaches the electron multiplier 4. Positive ions move from the through hole 2*a* toward the input electrode 32, and negative ions move from the through hole 2*a* toward the input electrode 42. Therefore, the potential gradient in the space (ion transfer region) between the ion introduction unit 2 and the input electrodes 32 and 42 can affect the ion trajectory.

As shown in FIGS. 6 and 7, when the input electrode 32 does not include the extension portion 32*b*, since the multiplier 31 is exposed, the voltage (potential) of the multiplier 31 affects the potential in the internal space S. Similarly, when the input electrode 42 does not include the extension portion 42*b*, since the multiplier 41 is exposed, the voltage (potential) of the multiplier 41 affects the potential in the internal space S. Although the absolute value of the voltage applied to the input electrode 32 is equal to the absolute value of the voltage applied to the input electrode 42, the absolute value of the voltage of the multiplier 41 becomes larger than the absolute value of the voltage of the multiplier 31. The difference between them becomes larger as a position approaches the output electrodes 33 and 43. Therefore, since a positive voltage has a greater influence on the potential in the internal space S than a negative voltage, the symmetry between the positive potential gradient and the negative potential gradient is largely broken with respect to the virtual plane. As a result, a positive potential is also generated in the space 51 in the ion transfer region.

Therefore, at the time of positive ion detection, the repulsive component due to the positive potential is larger than the attracting component due to the negative potential, so that a force that pulls positive ions away from the electron multiplier 4 in the direction D2 is applied to the positive ions. Similarly, at the time of negative ion detection, the attracting component due to the positive potential is larger than the repulsive component due to the negative potential, so that a force that pulls negative ions away from the electron multiplier 3 in the direction D2 is applied to the negative ions. When the distance L1 and the distance L2 are set based on an ideal state in which the symmetry between the positive potential gradient and the negative potential gradient is high, the distance L1 and the distance L2 are equal to each other. In this case, in the examples shown in FIGS. 6 and 7, the possibility that positive ions reach the input electrode 32 is reduced, so that the detection accuracy of positive ions may be reduced. Similarly, the possibility that negative ions reach the input electrode 42 is reduced, so that the detection accuracy of negative ions may be reduced.

On the other hand, as shown in FIGS. 4 and 5, when the input electrode 32 includes the extension portion 32*b*, the end portion including the end face 31*a* of the multiplier 31 is covered by the extension portion 32*b*. Therefore, the influence of the voltage of the multiplier 31 on the potential in the internal space S is reduced, and the influence of the voltage applied to the input electrode 32 on the potential in the internal space S is increased. Similarly, when the input electrode 42 includes the extension portion 42*b*, the end portion including the end face 41*a* of the multiplier 41 is covered by the extension portion 42*b*. Therefore, the influence of the voltage of the multiplier 41 on the potential in the internal space S is reduced, and the influence of the voltage applied to the input electrode 42 on the potential in the internal space S is increased. As a result, as compared with FIGS. 6 and 7, the symmetry between the positive potential gradient and the negative potential gradient is improved in the ion transfer region. Therefore, at the time of positive ion detection, the repulsive component and the attracting component can be balanced, and the possibility that positive ions reach the input electrode 32 is increased, so that the detection accuracy of positive ions can be improved. Similarly, at the time of negative ion detection, the repulsive component and the attracting component can be balanced, and the possibility that negative ions reach the input electrode 42 is increased, so that the detection accuracy of negative ions can be improved.

Since the extension portion 32*b* has a cylindrical shape, the end portion including the end face 31*a* of the multiplier 31 is surrounded around the axis of the extension portion 32*b* by the extension portion 32*b*. Similarly, since the extension portion 42*b* has a cylindrical shape, the end portion including the end face 41*a* of the multiplier 41 is surrounded around the axis of the extension portion 42*b* by the extension portion 42*b*. Therefore, the symmetry between the positive potential gradient and the negative potential gradient is further improved in the ion transfer region compared with the configuration in which a part of the end portion including the end face 31*a* is covered by the extension portion 32*b* and a part of the end portion including the end face 41*a* is covered by the extension portion 42*b*. As a result, the detection accuracy of positive ions and negative ions can be improved.

The distance L1 in the direction D2 between the electron multiplier 3 and the central axis AX is equal to the distance L2 in the direction D2 between the electron multiplier 4 and the central axis AX. Therefore, since it is not necessary to adjust the arrangement of the electron multiplier 3 and the arrangement of the electron multiplier 4 individually, it is possible to simplify the design of the arrangement of the electron multiplier 3 and the electron multiplier 4.

The electron multiplier 3 and the electron multiplier 4 are spaced apart from each other in the direction D2 and extend in the direction D1. Both the input electrode 32 and the input electrode 42 face the ion introduction unit 2 in the direction D1. In other words, the body 32*a* and the body 42*a* face in the same direction, and the input electrode 32 and the input electrode 42 do not face each other. Therefore, the possibility that the input electrode 32 receives noise derived from charged particles generated in the electron multiplier 4 can be reduced. Similarly, the possibility that the input electrode 42 receives noise derived from charged particles generated in the electron multiplier 3 can be reduced. As a result, the detection accuracy of positive ions and negative ions can be improved.

In a configuration in which the electron multiplier 3 and the electron multiplier 4 are mounted on different substrates, it is necessary to adjust the position of the electron multiplier 3 and the position of the electron multiplier 4 individually. On the other hand, in the ion detector 1 according to the above-described mounting example, since the electron multiplier 3 and the electron multiplier 4 are disposed on one substrate 51, the distance between the electron multiplier 3 and the electron multiplier 4 is constant. Therefore, only by aligning the center point in the direction D2 between the electron multiplier 3 and the electron multiplier 4 with the central axis AX, the positions of the electron multiplier 3 and the electron multiplier 4 in the direction D2 are determined. As a result, the assembly accuracy of the ion detector 1 can be improved.

Not only the electron multipliers 3 and 4 and the anodes 5 and 6 but also the capacitors 7 and 8 and the switching circuit 9 are mounted on the substrate 51. In this configuration, since the components of the ion detector 1 are mounted on one substrate 51, it is not necessary to prepare another substrate for mounting the capacitors 7 and 8 and the switching circuit 9. Therefore, the number of parts can be reduced.

When the potential difference between the anode 5 and the anode 6 is large, a creeping discharge may occur along the main surface 51*a* or the back surface 51*b* of the substrate 51 between the anode 5 and the anode 6. On the other hand, the substrate 51 is provided with the slit 51*s* penetrating the substrate 51 in the direction D1 between the anode 5 and the anode 6. Therefore, the creeping distance between the anode 5 and the anode 6 becomes longer. As a result, the possibility of a creeping discharge occurring between the anode 5 and the anode 6 can be reduced.

Since the ion introduction unit 2 is supported by the spacer 52 and 53, the position of the central axis AX (through hole 2*a*) is determined. This makes it possible to improve the assembly accuracy of the ion detector 1.

It should be noted that the ion detector according to the present disclosure is not limited to the embodiments described above.

Either one of the input electrodes 32 and 42 may not include the extension portion. Again, the symmetry between the positive potential gradient and the negative potential gradient can be improved in the ion transfer region compared with a configuration in which both input electrodes 32 and 42 do not include the extension portions. As a result, the detection accuracy of positive ions and negative ions can be improved.

The arrangement of the electron multiplier 3 and the electron multiplier 4 is not limited to the arrangement in the mounting example shown in FIG. 2. For example, the electron multiplier 3 and the electron multiplier 4 may be arranged so that the input electrode 32 and the input electrode 42 face each other in the direction D2 across the central axis AX. In this case, the symmetry between the positive potential gradient and the negative potential gradient with respect to the virtual plane can be maintained. One of the electron multiplier 3 and the electron multiplier 4 may be arranged to extend in the direction D1, and the other may be arranged to extend in the direction D2.

The absolute value of the voltage applied to the input electrode 32 may not be equal to the absolute value of the voltage applied to the input electrode 42.

Figure 8:
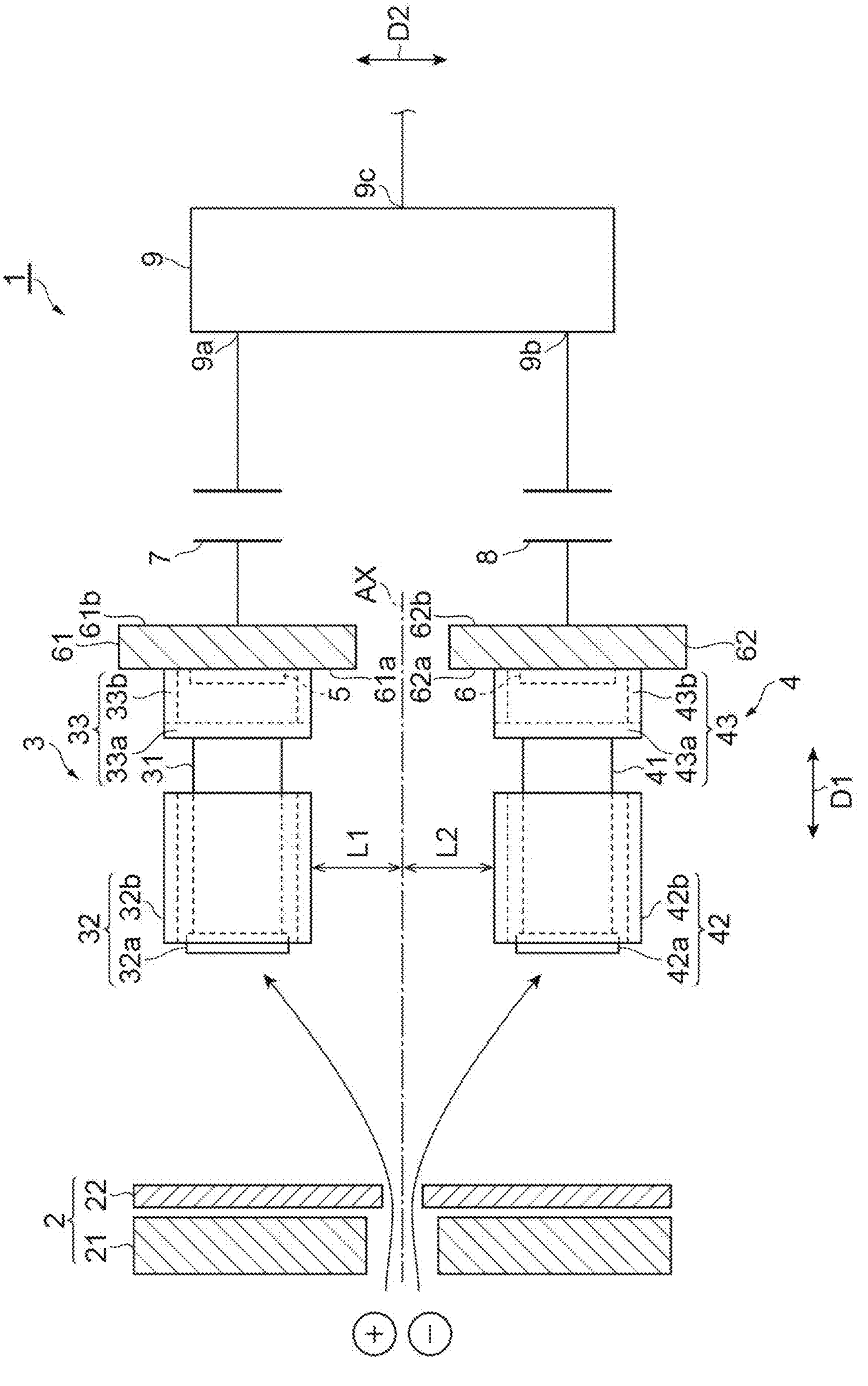
FIG. 8 is a cross-sectional view showing yet another mounting example of the ion detector shown in FIG. 1.

Next, yet another mounting example of the ion detector 1 shown in FIG. 1 will be described with reference to FIG. 8. FIG. 8 is a cross-sectional view showing yet another mounting example of the ion detector shown in FIG. 1. As shown in FIG. 8, the ion detector 1 of this mounting example is mainly different from the ion detector 1 of the mounting example shown in FIG. 2 in that the ion detector 1 of this mounting example includes a substrate 61 (first substrate) and a substrate 62 (second substrate) instead of the substrate 51, and in the mounting of the capacitors 7 and 8 and the switching circuit 9.

The substrate 61 is a plate-like member on which the electron multiplier 3 is mounted. The substrate 61 is, for example, a printed circuit board such as a glass epoxy substrate. The substrate 61 has a main surface 61*a* (first main surface) and a back surface 61*b* opposite to the main surface 61*a*. The main surface 61*a* and the back surface 61*b* intersect with (here, orthogonal to) the direction D1. The main surface 61*a* faces the ion introduction unit 2 in the direction D1. The substrate 62 is a plate-like member on which the electron multiplier 4 is mounted. The substrate 62 is, for example, a printed circuit board such as a glass epoxy substrate. The substrate 62 has a main surface 62*a* (second main surface) and a back surface 62*b* opposite to the main surface 62*a*. The main surface 62*a* and the back surface 62*b* intersect with (here, orthogonal to) the direction D1. The main surface 62*a* faces the ion introduction unit 2 in the direction D1. The substrate 61 and the substrate 62 are arranged in the direction D2. The substrate 61 and the substrate 62 are arranged substantially symmetrically with respect to the virtual plane. The virtual plane is a plane that is perpendicular to the direction D2 and extends along the central axis AX.

The anode 5 is provided on the main surface 61*a*. The anode 5 may be formed as a wiring pattern on the main surface 61*a*. The anode 6 is provided on the main surface 62*a*. The anode 6 may be formed as a wiring pattern on the main surface 62*a*. The anode 5 and the anode 6 are arranged substantially symmetrically with respect to the virtual plane.

The electron multiplier 3 is disposed on the main surface 61*a* such that the output electrode 33 faces the anode 5 in the direction D1. In this mounting example, the other end of the support portion 33*b* is fixed to the main surface 61*a* of the substrate 61 by screws, welding or the like. The electron multiplier 4 is disposed on the main surface 62*a* such that the output electrode 43 faces the anode 6 in the direction D1. In this mounting example, the other end of the support portion 43*b* is fixed to the main surface 62*a* of the substrate 62 by screws, welding or the like.

The capacitors 7 and 8 and the switching circuit 9 are mounted on a substrate (not shown) different from the substrates 61 and 62. Note that the capacitor 7 may be mounted on the substrate 61, and the capacitor 8 may be mounted on the substrate 62.

In this mounting example, since the anode 5 and the anode 6 are disposed on different substrates, it is possible to reduce the possibility of a creeping discharge occurring between the anode 5 and the anode 6. Further, since the electron multiplier 3 and the electron multiplier 4 are arranged on different substrates, the degree of freedom in the arrangement of the electron multiplier 3 and the electron multiplier 4 can be improved.

Figure 9:
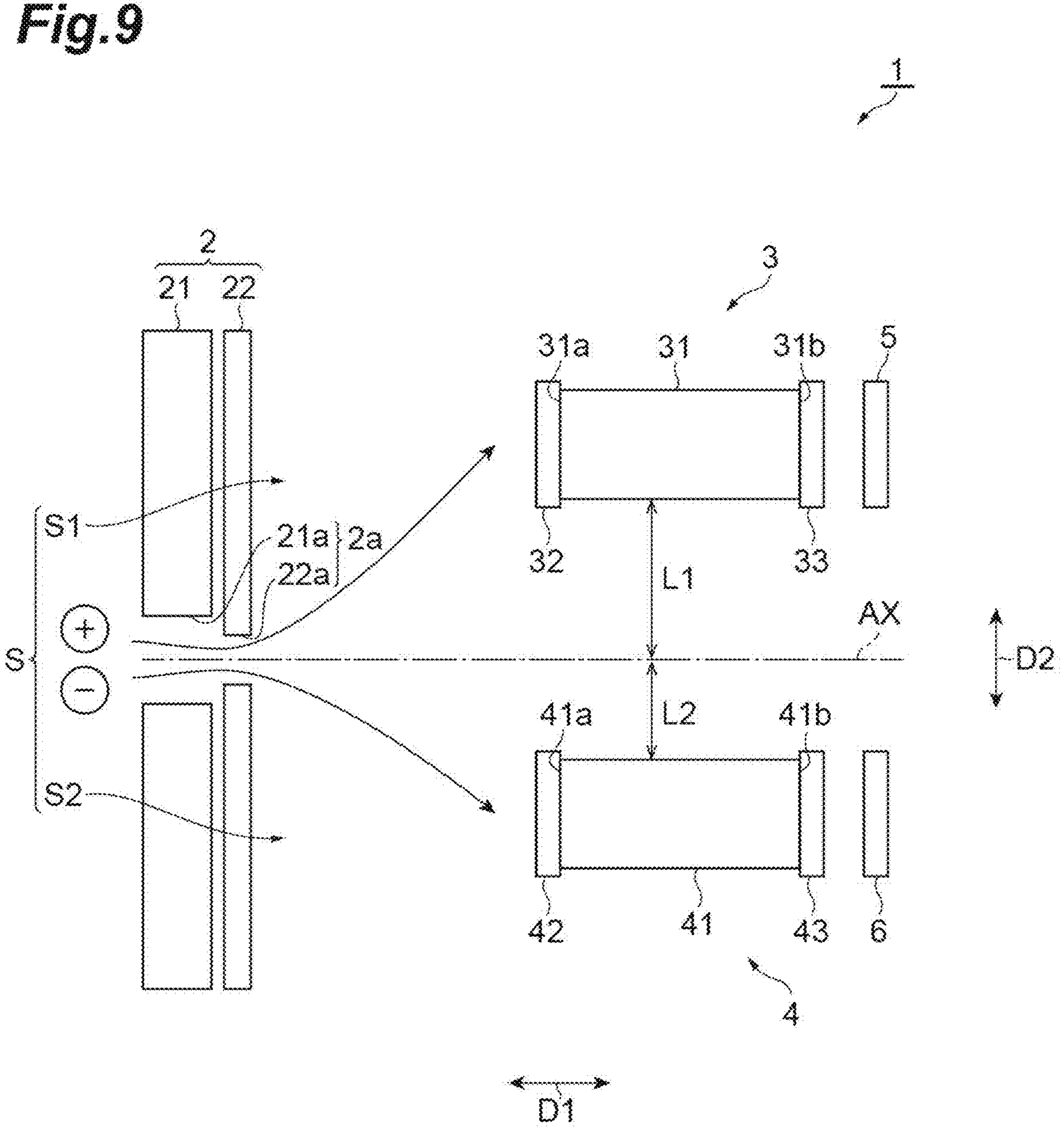
FIG. 9 is a cross-sectional view showing yet another mounting example of the ion detector shown in FIG. 1.

Next, yet another mounting example of the ion detector 1 shown in FIG. 1 will be described with reference to FIG. 9. FIG. 9 is a cross-sectional view showing yet another mounting example of the ion detector shown in FIG. 1. As shown in FIG. 9, the input electrode 32 does not include the extension portion 32*b*. The input electrode 42 does not include the extension portion 42*b*. In such a configuration, as described above, at the time of positive ion detection, positive ions are repelled by a positive potential, and a force that pulls positive ions away from the electron multiplier 4 in the direction D2 is applied to the positive ions. Similarly, at the time of negative ion detection, negative ions are attracted by a positive potential, and a force that pulls negative ions away from the electron multiplier 3 in the direction D2 is applied to the negative ions.

On the other hand, the electron multiplier 3 and the electron multiplier 4 are arranged asymmetrically with respect to the virtual plane along the central axis AX. Specifically, the electron multiplier 3 and the electron multiplier 4 are arranged so that the distance L1 is larger than the distance L2. As the difference between the voltage applied to the output electrode 33 and the voltage applied to the output electrode 43 increases, the distance L1 is set to a value larger than the distance L2. The distance L1 may be determined by pre-calculating the trajectory of the positive ion by simulation. The distance L2 may be determined by pre-calculating the trajectory of the negative ion by simulation.

According to this configuration, since the electron multiplier 3 is further away from the central axis AX in the direction D2 than the electron multiplier 4, the possibility that positive ions enter the input electrode 32 can be enhanced. Similarly, since the electron multiplier 4 is closer to the central axis AX in the direction D2 than the electron multiplier 3, the possibility that negative ions enter the input electrode 42 can be enhanced. Therefore, the detection accuracy of positive ions and negative ions can be improved.

What is claimed is:

1. An ion detector comprising:
- a first electron multiplier configured to detect first ions having a first polarity;
- a second electron multiplier configured to detect second ions having a second polarity different from the first polarity;
- a first anode configured to capture electrons emitted from the first electron multiplier;
- a second anode configured to capture electrons emitted from the second electron multiplier; and
- a switching circuit including a first input terminal electrically connected to the first anode, a second input terminal electrically connected to the second anode, and an output terminal, the switching circuit being configured to selectively connect one of the first input terminal and the second input terminal to the output terminal.

2. The ion detector according to claim 1, further comprising:
- an ion introduction unit provided with a through hole having a central axis extending in a first direction,
- wherein the first electron multiplier comprises a first multiplier extending in the first direction, a first input electrode provided at a first end of the first multiplier in the first direction, and a first output electrode provided at a second end of the first multiplier in the first direction,
- wherein the second electron multiplier comprises a second multiplier extending in the first direction, a second input electrode provided at a first end of the second multiplier in the first direction, and a second output electrode provided at a second end of the second multiplier in the first direction,
- wherein the first input electrode receives the first ions having passed through the through hole,
- wherein the second input electrode receives the second ions having passed through the through hole, and
- wherein the first electron multiplier and the second electron multiplier are spaced apart from each other in a second direction intersecting with the first direction.

3. The ion detector according to claim 2, wherein the first input electrode includes a first body facing the ion introduction unit in the first direction and a first extension portion extending toward the first output electrode in the first direction, and
- wherein the first extension portion covers a part of the first multiplier facing the second multiplier.

4. The ion detector according to claim 3, wherein the first extension portion has a cylindrical shape.

5. The ion detector according to claim 3, wherein the second input electrode includes a second body facing the ion introduction unit in the first direction and a second extension portion extending toward the second output electrode in the first direction, and
- wherein the second extension portion covers a part of the second multiplier facing the first multiplier.

6. The ion detector according to claim 5, wherein the second extension portion has a cylindrical shape.

7. The ion detector according to claim 3, wherein a distance between the first electron multiplier and the central axis in the second direction is equal to a distance between the second electron multiplier and the central axis in the second direction.

8. The ion detector according to claim 2, wherein the first ions are positive ions, the second ions are negative ions, and a distance between the first electron multiplier and the central axis in the second direction is larger than a distance between the second electron multiplier and the central axis in the second direction.

9. The ion detector according to claim 2, further comprising a substrate including a main surface facing the ion introduction unit in the first direction,
- wherein the first anode and the second anode are provided on the main surface,
- wherein the first electron multiplier is disposed on the main surface such that the first output electrode faces the first anode in the first direction, and
- wherein the second electron multiplier is disposed on the main surface such that the second output electrode faces the second anode in the first direction.

10. The ion detector according to claim 9, wherein the switching circuit is mounted on the substrate.

11. The ion detector according to claim 9, wherein the substrate is provided with a slit penetrating the substrate in the first direction between the first anode and the second anode.

12. The ion detector according to claim 9, further comprising a support member that is provided on the main surface and supports the ion introduction unit.

13. The ion detector according to claim 2, further comprising:

a first substrate including a first main surface facing the ion introduction unit in the first direction; and a second substrate including a second main surface facing the ion introduction unit in the first direction, wherein the first anode is provided on the first main surface, wherein the second anode is provided on the second main surface, wherein the first electron multiplier is disposed on the first main surface such that the first output electrode faces the first anode in the first direction, and wherein the second electron multiplier is disposed on the second main surface such that the second output electrode faces the second anode in the first direction.

* * * * *